(12) United States Patent
Arrasvuori

(10) Patent No.: US 9,521,315 B2
(45) Date of Patent: Dec. 13, 2016

(54) APPARATUS AND METHOD FOR FORMING NEW IMAGES BY DETERMINING STYLISTIC SETTINGS OF EXISTING IMAGES

(75) Inventor: Juha Henrik Arrasvuori, Tempere (FI)

(73) Assignee: Nokia Technologies Oy, Espoo (FI)

( * ) Notice: Subject to any disclaimer, the term of this patent is extended or adjusted under 35 U.S.C. 154(b) by 141 days.

(21) Appl. No.: 13/286,382

(22) Filed: Nov. 1, 2011

(65) Prior Publication Data

US 2013/0107069 A1 May 2, 2013

(51) Int. Cl.
*H04N 5/228* (2006.01)
*H04N 5/232* (2006.01)

(52) U.S. Cl.
CPC ...... *H04N 5/23222* (2013.01); *H04N 5/23293* (2013.01)

(58) Field of Classification Search
CPC ............ H04N 5/23293; H04N 5/23222; H04N 5/23245; H04N 5/23219; H04N 5/23229
USPC .......................................... 348/220.1, 222.1
See application file for complete search history.

(56) References Cited

U.S. PATENT DOCUMENTS

| | | | |
|---|---|---|---|
| 6,292,218 B1* | 9/2001 | Parulski et al. | 348/220.1 |
| 8,848,067 B2* | 9/2014 | Mori | G11B 27/034 |
| | | | 348/220.1 |
| 2003/0146983 A1* | 8/2003 | Hoshuyama | H04N 9/735 |
| | | | 348/223.1 |
| 2005/0007468 A1 | 1/2005 | Stavely | |
| 2005/0243185 A1* | 11/2005 | Son | H04N 5/23293 |
| | | | 348/222.1 |
| 2007/0002163 A1* | 1/2007 | Madej et al. | 348/362 |
| 2007/0041030 A1* | 2/2007 | Kojima | H04N 1/2112 |
| | | | 358/1.13 |
| 2008/0051063 A1* | 2/2008 | Hisamitsu | H04M 1/72555 |
| | | | 455/412.1 |
| 2009/0015702 A1 | 1/2009 | Garcia | |
| 2011/0050915 A1 | 3/2011 | Wang et al. | |
| 2012/0307096 A1* | 12/2012 | Ford et al. | 348/222.1 |
| 2013/0107069 A1* | 5/2013 | Arrasvuori | 348/220.1 |

* cited by examiner

*Primary Examiner* — Antoinette Spinks
(74) *Attorney, Agent, or Firm* — Harrington & Smith

(57) ABSTRACT

Apparatus and method are provided. The apparatus includes at least one processor and a memory. The solution includes determining settings of one or more images or video clips stored in the memory of the apparatus or retrieved from a network. The processor is configured to apply these determined settings when controlling the forming one or more new images.

20 Claims, 4 Drawing Sheets

APPARATUS AND METHOD FOR FORMING NEW IMAGES BY DETERMINING STYLISTIC SETTINGS OF EXISTING IMAGES

FIELD

The exemplary and non-limiting embodiments of the invention relate generally to forming images in an imaging device or controlling an imaging device.

BACKGROUND

The following description of background art may include insights, discoveries, understandings or disclosures, or associations together with disclosures not known to the relevant art prior to the present invention but provided by the invention. Some of such contributions of the invention may be specifically pointed out below, whereas other such contributions of the invention will be apparent from their context.

The popularity of photography is continuously increasing. This applies especially to digital photography as the supply of inexpensive digital cameras has improved. Also the integrated cameras in mobile phones have contributed to the increase in the popularity of photography.

Most modern cameras are versatile and highly configurable. In addition to traditional settings such as focusing, aperture, exposure time, the cameras are able to perform various digital processing to images.

An enormous amount of digital photographs or images are available on the Internet. Many of these images have been taken by professional photographers who know how to optimize the settings on their digital cameras to obtain good looking photographs. Further, many photos published in online services have been optimized with an image-editing software. Finally, easy-to-use camera applications with "stylistic filters" and "artistic filters" have gained popularity. These circumstances results in the situation where an average user can see nice looking photos everywhere, but doesn't necessarily know how to obtain similar photos with his or her camera application.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to a more detailed description that is presented later.

According to an aspect of the present invention, there is provided an apparatus, comprising at least one processor; and at least one memory including computer program code, the at least one memory and the computer program code configured to, with the at least one processor, cause the apparatus at least to perform: determine settings of one or more images or video clips; apply the determined settings when controlling the forming one or more images.

According to another aspect of the present invention, there is provided a method comprising: determining settings of one or more images or video clips; applying the determined settings when controlling the forming one or more images.

LIST OF DRAWINGS

Embodiments of the present invention are described below, by way of example only, with reference to the accompanying drawings, in which FIG. 1 illustrates an example of an imaging device of an embodiment;

DESCRIPTION OF SOME EMBODIMENTS

Figure 1:
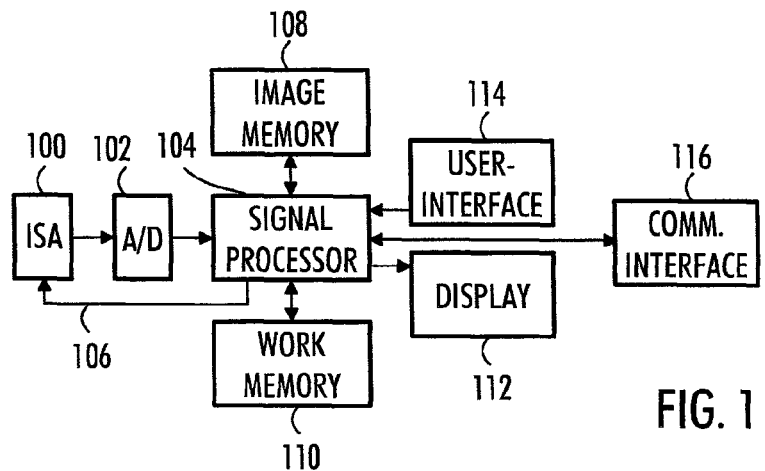

FIG. 1 illustrates a generalised digital imaging device which may be utilized in some embodiments of the invention. It should be noted that embodiments of the invention may also be utilised in digital cameras different from the apparatus of FIG. 1, which is just an example of a possible structure.

Examples of the apparatus include a standalone digital camera, a mobile phone equipped with a camera, a tablet computer, a laptop computer, a personal computer or a camera accessory configured to be attached to a communication or processing device or a communication or processing device controlling an external camera accessory.

The apparatus of FIG. 1 is configured to form an image and store the image in a memory for later viewing. The images may be either still images or video clips. The apparatus of FIG. 1 comprises an image sensing arrangement 100. The image sensing arrangement comprises a lens assembly and an image sensor. The structure of the arrangement 100 will be discussed below. The image sensing arrangement is configured to capture an image and convert the captured image into an electrical form. Electric signal produced by the arrangement 100 is led to an A/D converter 102 which converts the analogue signal into a digital form. From the converter the digitised signal is taken to a processor or circuitry 104. The image data is processed in the processor to create an image file. An output signal of the image sensing arrangement 100 contains raw image data which needs post-processing, such as white balancing and colour processing. The processor 104 is also responsible for giving exposure control commands 106 to the image sensing arrangement 100.

The apparatus may further comprise an image memory 108 where the processor may store finished images, a work memory 110 for data and program storage, a display 112 and a user interface 114, which typically comprises a keyboard, keypad or corresponding means for the user to give input to the apparatus.

The display 112 may be a touch-sensitive display. The display may be used for giving input and commands to the apparatus. The processor may be configured to display images stored in either the work memory 110 or image memory 108 on the display. The controller may configure the display to act as a viewfinder with which the user may see and adjust the image to be captured. In addition, the apparatus may comprise another viewfinder as part of the user interface 114.

The apparatus may further comprise a communication interface 116. Using the communication interface 116 the apparatus may be connected to communication networks and internet. For example, if the apparatus is a part of a mobile phone, the communication interface may comprise a cellular transceiver and associated equipment known to one skilled in the art. The communication interface may comprise a wireless local area network (WLAN) transceiver or a Bluetooth™ transceiver.

Figure 2:
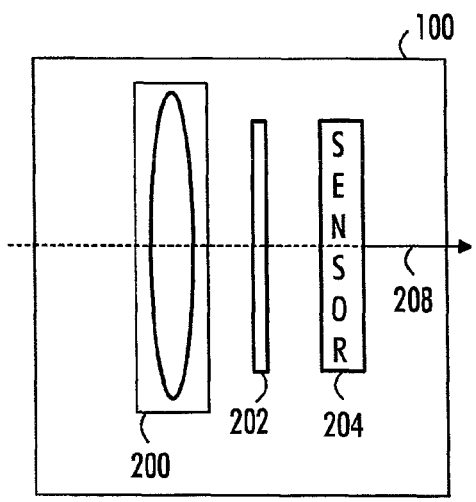
FIG. 2 illustrates an example of an image sensing arrangement.

FIG. 2 illustrates an example of an image sensing arrangement 100. In this example, the image sensing arrangement comprises a lens assembly 200 which one or more. The arrangement further comprises a diaphragm 202 which may be adjustable. The arrangement further comprises an image sensor 202. The diaphragm controls the amount of light that is passed through the lens assembly to the image sensor.

The image sensor 204 is typically, but not necessarily, a single solid-state sensor, such as a CCD (Charged Coupled Device) or a CMOS (Complementary Metal-oxide Semiconductor) sensor known to one skilled in the art. The image sensor 204 converts light into an electric current. This electric analogue signal 208 generated by the image sensor is converted into a digital form by the A/D converter 102, as illustrated in FIG. 1.

Details of the above described structure are not relevant regarding the embodiments of the invention.

Figure 3:
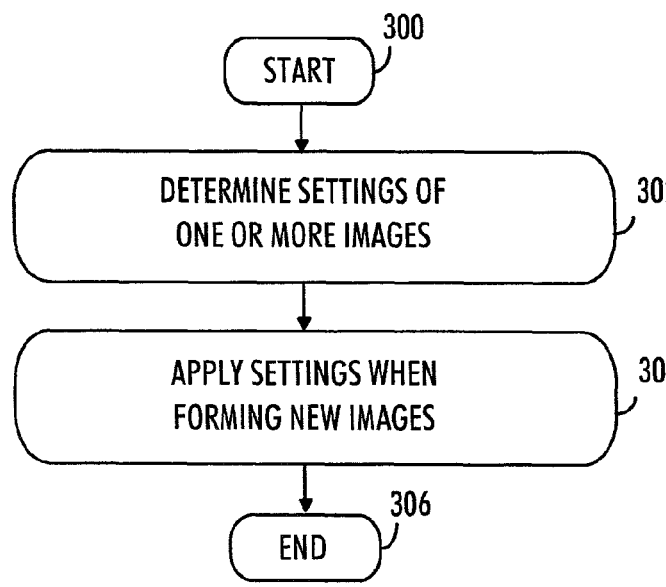
FIGS. 3 and 4 are flowcharts illustrating embodiments of the invention.

FIG. 3 is a flowchart illustrating an embodiment of the invention. The embodiment starts at step 300.

In step 302, the processor 104 is configured to determine settings of one or more images or video clips. The images or video clips may be shown on the display.

In step 304, the processor 104 is configured to apply the determined settings when controlling the forming a new image or images.

The process ends in step 306.

Figure 4:
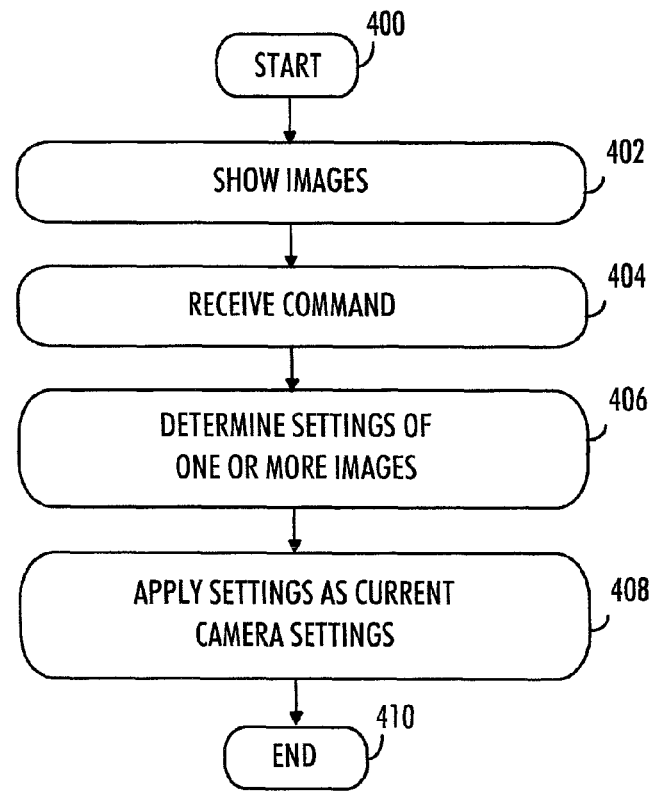

FIG. 4 is a flowchart illustrating an embodiment of the invention. The embodiment is studied in following referring also to FIGS. 5A, 5B and 5C. The embodiment starts at step 400.

Figure 5A:
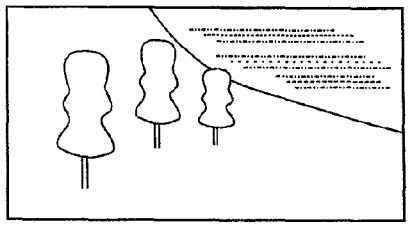
FIGS. 5A, 5B and 5C illustrate embodiments of the invention.

In step 402, the user views images on the display 112 of the apparatus as depicted on FIG. 5A. The images may be stored in the image memory 108 of the apparatus. The images may have been taken using the apparatus or they may have been downloaded from external sources such as Internet using the communication interface 116. In addition, the images may be streamed from Internet or from other source using the communication interface. The processor of the apparatus is configured to show desired images on the display on the basis of the command given by the user using the user interface 114.

In step 404, the processor of the apparatus receives a command from the user to determine settings of the image currently shown on the display of the apparatus and apply the setting when capturing new images.

Figure 5B:
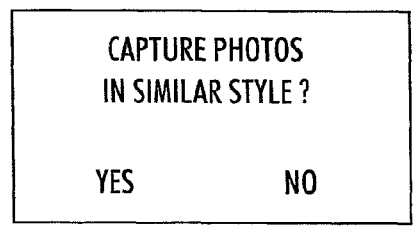

In an embodiment, the user gives first the apparatus a command to move from viewing mode to capturing mode, as the user wishes to take new images. The processor may be configured to present the user a query whether to apply the setting of the image viewed last when capturing new images. The user may respond yes/no, for example. FIG. 5B illustrates this embodiment.

In an embodiment, the user may select a separate command which instructs the processor to determine the settings of the image last viewed by the user.

In step 406, the processor is configured to determine settings of one or more images or video clips. The obtaining of the settings may be performed in various ways.

In an embodiment, the processor is configured to determine the settings from metadata stored in an image or video file. Virtually all digital image capturing apparatuses store some metadata associated with the image in the image file. The metadata comprises information related to the properties of the image and the settings with which the image was captured. The apparatuses may be configured to utilize a format denoted as EXIF (Exchangeable image format) when storing metadata. The EXIF format may be used to store date and time information, camera settings, a thumbnail of the image, contextual information obtained by the sensors of the imaging apparatus and other editable information such as keywords.

In an embodiment, the processor is being configured to determine settings by analyzing one or more images or a video clip.

Examples of technical and/or stylistic settings that can be accessed from the metadata or by analyzing the image itself include:

Resolution, aspect ratio
Focus
Exposure time
Compression (if supported by the image file type)
Use of flashlight
Color space (e.g. full color, emphasized colors, or grayscale)
Contrast
Softening
"Artistic filters": type of filter and its properties
Over- and underexposure
Artifacts such as film grain or digital noise, for example.

In step 408, the processor is configured to apply the determined settings as current camera settings to be applied when forming a new image or images. When the settings of more than one image are applied when taking new images, the current camera settings may be determined as a collective representation of the settings of several images. The collective settings may be calculated on the basis of separate settings of each image, for example by averaging the values of the settings.

Figure 5C:
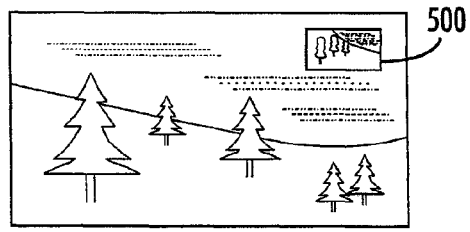

In an embodiment, the processor is configured to control a display to show a viewfinder image on the display showing the image which is to be taken. On top of the viewfinder image a thumbnail 500 of the image which settings are currently applied may be shown, as illustrated in FIG. 5C.

In an embodiment, the processor is configured to control a display to show a viewfinder image on the display and on top of the viewfinder image a thumbnail preview 500 of the viewfinder image on which the selected settings have been applied.

The process ends in step 410.

Figure 6A:
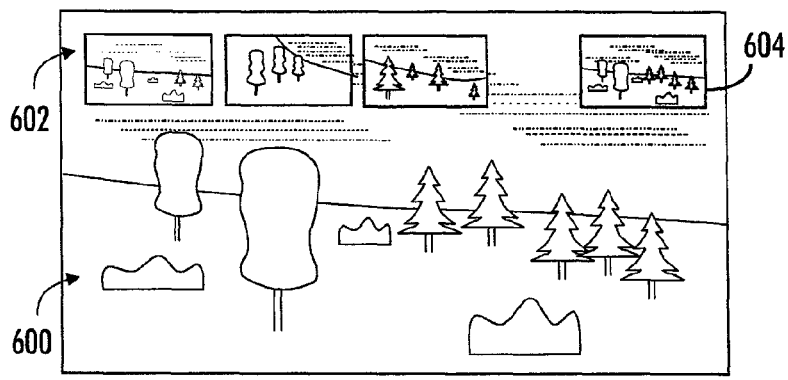
FIGS. 6A and 6B illustrate embodiments of the invention.

FIG. 6A illustrates another embodiment where the user is capturing images. The main portion of the display is configured to show live viewfinder image 600. On the upper left corner of the display are shown thumbnails 602 of the last photos in the currently selected folder or album. The settings of these images are utilized in capturing new images. A small thumbnail 604 to the right shows a version of the viewfinder image with the settings applied from the earlier photos in the currently chosen album.

Figure 6B:
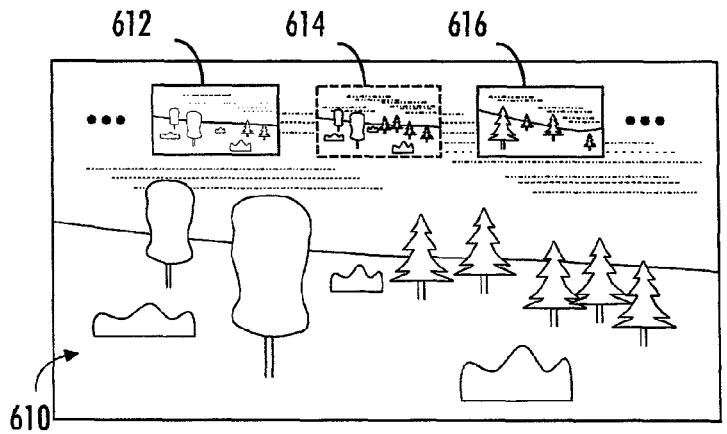

FIG. 6B illustrates another embodiment where the user is capturing images. The main portion of the display is configured to show live viewfinder image 610. In this case, the user has chosen an existing slideshow of photos. The user then wishes to capture and insert a new image between two existing photos in the slideshow. The user defines the point of insert and opens the camera application. An average or "collective representation" of the settings of the previous and the subsequent photo in the slideshow are applied as current settings in the camera application. When the user aims for capturing the new photo, thumbnails of the previous 612 and subsequent 614 photos in the resulting slideshow are shown on top of the viewfinder. A thumbnail 616 shows a version of the viewfinder image with the settings applied from the photos 612, 614.

As an example of another embodiment, consider a case where a user is viewing a black and white art movie as a video clip on his mobile device. The user decides to capture photos in a similar style and presses the mobile device's camera capture button for a long time. This "long press" initiates "imitative camera" functionality. The currently viewed media clip is analyzed and the determined stylistic parameters (e.g. grayscale colors, widescreen 2.39:1 aspect ratio, "increased grain" filter, increased contrast) are applied to the camera application. A "short press" would start the camera application with normal preset settings.

In an embodiment, the user is looking through the camera viewfinder for a location to photograph. The location reminds the user of a movie the user has recently seen. The user wants to create a photo with a similar mood as in the movie. The user accesses with a media viewer application the movie file and the scene he/she remembered. The user pauses the playback of the movie. Then the user returns to the camera application that has obtained the camera settings from the movie clip and shows the viewfinder image through these settings. For example, the aspect ratio and color space have changed to match those in the movie. As an alternative embodiment, the movie may run in the background and updated the current settings to the camera application as they change. The user may for example loop a segment from the movie clip.

Figure 7:
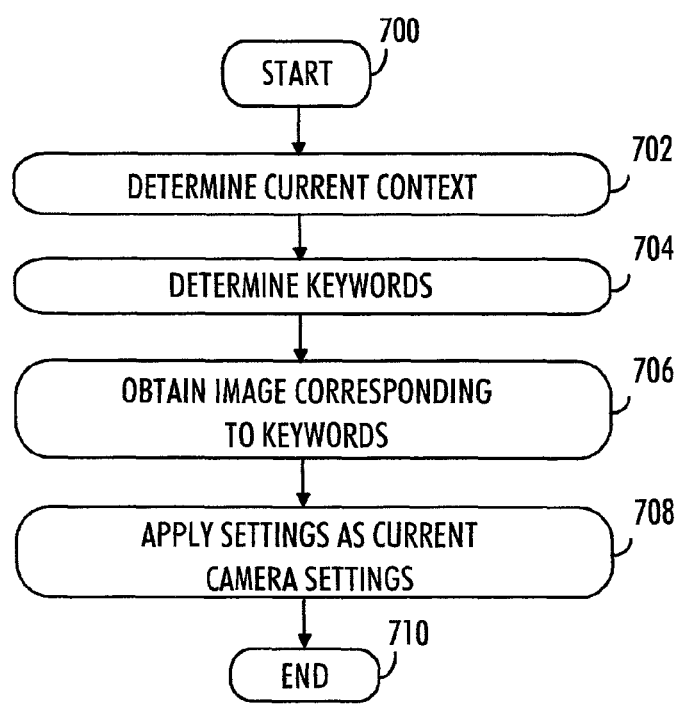
FIGS. 7 and 8 are flowcharts illustrating embodiments of the invention.

FIG. 7 is a flowchart illustrating an embodiment of the invention. The embodiment starts at step 700. Also in this embodiment, the current camera settings are obtained from an image or video clip. However, in this embodiment, the user does not directly choose the photo or video clip.

In step 702, the processor 104 running a suitable application is configured to gather information from sensors of the mobile device and determine the current context of the user. Possible sensors include, for example, satellite positioning system receiver (such as Global Positioning System GPS), light, temperature and moisture. For determining the context, the data obtained from the sensors is augmented with data from clock and calendar on the device. The current context of the user can be described with parameters and keywords such as location coordinates or description of city and district, time of day, season, weather condition (e.g. sunny, rain, fog), type of light (e.g. natural light or artificial light).

In step 704, the context is described by the application through keywords.

In step 706, an image corresponding to the keywords is obtained. For example, the keywords may be sent to an image or video service that returns to the mobile device an image or video that best matches the keywords i.e. the user's current context.

In step 708, this photo or video is then used by the application to set the current camera settings in above described manners. A thumbnail of the retrieved photo or video clip may be shown in the camera viewfinder (as shown in FIG. 5C). The user may change this image by flicking on its thumbnail in the viewfinder. A new image (second best match for the keywords) is then retrieved from the service and used to obtain the updated camera settings.

The process ends in step 710.

The above embodiment is useful in situations where the user cannot choose (or does not have on his device access to) an image that matches the current context and could thus be used for obtaining the camera settings for taking similarly styled photos. The current context may for example be new to the user, so he may want to use photos taken by others in a similar context as the "aesthetic target" for the new to-be-captured photos.

Figure 8:
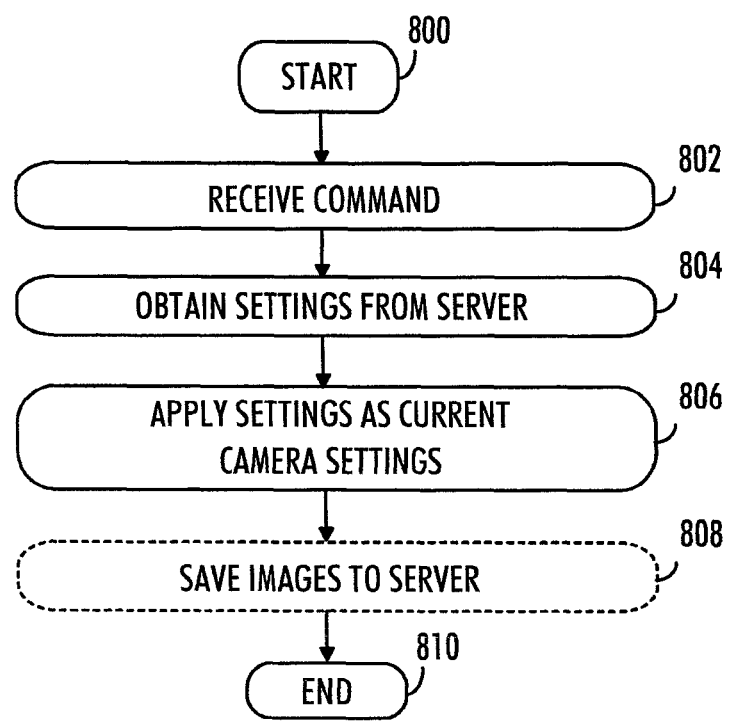

FIG. 8 is a flowchart illustrating another embodiment of the invention. The embodiment starts at step 800. In this embodiment, when two or more users contribute by capturing new photos to the same online photo album, their camera applications synchronize the settings to be the same to help these users to create stylistically similar photos to the album.

In step 802, the processor 104 running a suitable application is configured to receive a command from the user. The command comprises information regarding a shared photo album on an Internet server the user wishes to contribute to.

In step 804, the processor obtains settings for the camera application by contacting the server of the photo service and analyzing the images on the given shared album. The analyzing may be performed by reading the metadata stored in the images of the album or by analyzing the images themselves as explained above. The settings may be determined as a collective representation of the settings of several images. The collective settings may be calculated on the basis of separate settings of each image, for example by averaging the values of the settings. The collective settings may also be limited to a few of the most recent images in the album. The user may also manually define and change the settings from a menu of options.

In step 806, the processor is configured to apply the determined settings as current camera settings to be applied when forming a new image or images.

In optional step 808, the processor is configured to send captured images to the shared album stored on Internet server. The contributions of different users may be synchronous or asynchronous.

The process ends in step 810.

In an embodiment, an apparatus comprises means for determining settings of one or more images or video clips and means for applying the determined settings when controlling the forming one or more images.

The steps and related functions described in the above and attached figures are in no absolute chronological order, and some of the steps may be performed simultaneously or in an order differing from the given one. Other functions can also be executed between the steps or within the steps. Some of the steps can also be left out or replaced with a corresponding step.

The apparatuses or processors able to perform the above-described steps may be implemented as an electronic digital computer or circuitry, which may comprise a working memory (RAM), a central processing unit (CPU), and a system clock. The CPU may comprise a set of registers, an arithmetic logic unit, and a controller. The processor is controlled by a sequence of program instructions transferred to the CPU from the RAM. The processor may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

An embodiment provides a computer program embodied on a distribution medium, comprising program instructions which, when loaded into an electronic apparatus, are configured to control the apparatus to execute the embodiments described above.

The computer program may be in source code form, object code form, or in some intermediate form, and it may be stored in some sort of carrier, which may be any entity or device capable of carrying the program. Such carriers include a record medium, computer memory, read-only memory, and a software distribution package, for example. Depending on the processing power needed, the computer program may be executed in a single electronic digital computer or it may be distributed amongst a number of computers.

The apparatus may also be implemented as one or more integrated circuits, such as application-specific integrated circuits ASIC. Other hardware embodiments are also feasible, such as a circuit built of separate logic components. A hybrid of these different implementations is also feasible. When selecting the method of implementation, a person skilled in the art will consider the requirements set for the size and power consumption of the apparatus, the necessary processing capacity, production costs, and production volumes, for example.

It will be obvious to a person skilled in the art that, as technology advances, the inventive concept can be implemented in various ways. The invention and its embodiments are not limited to the examples described above but may vary within the scope of the claim.

The invention claimed is:

1. An apparatus, comprising
at least one processor; and
at least one memory including computer program code,
the at least one memory and the computer program code configured to, with the at least one processor, cause the apparatus at least to perform:
receive as an input an identification of two or more images or video clips;
determine stylistic settings of the identified two or more images or video clips by calculating average values of separate settings of each one of the two or more images or video clips, wherein the settings comprise color space, contrast setting, filtering, focus distance, file type, and compression ratio; and
apply the stylistic settings to one or more new images when forming the one or more new images, wherein the stylistic settings comprise an artistic filter.

2. The apparatus of claim 1, the apparatus being configured to control a display to show a viewfinder image on the display and a thumbnail version of the two or more existing images or video clips on top of the viewfinder image.

3. The apparatus of claim 1, the apparatus being configured to control a display to show a viewfinder image on the display and on top of the viewfinder image a thumbnail preview of the viewfinder image on which the determined settings have been applied.

4. The apparatus of claim 1, the apparatus being configured to receive a command from a user of the apparatus to apply the determined settings.

5. The apparatus of claim 1, the apparatus being configured to determine the settings from metadata stored in an image file.

6. The apparatus of claim 1, the apparatus being configured to determine the settings by analyzing the two or more existing images or video clips.

7. The apparatus of claim 1, the apparatus being configured to select the settings on the basis of settings determined from more than two existing images.

8. The apparatus of claim 1, the apparatus being configured to determine settings from an image or video clip shown last on a display.

9. The apparatus of claim 1, the apparatus being configured to connect to a network server storing images and/or video clips and determine settings of one or more existing images or video clips stored on the server.

10. The apparatus of claim 1, the apparatus being configured to determine settings related to capturing and processing an image or video clip.

11. The apparatus of claim 1, wherein the apparatus is configured to receive as an input an identification of two or more video clips, wherein the apparatus is configured to determine stylistic settings of the identified two or more video clips by calculating average values of separate settings of each one of the two or more video clips, and wherein the settings further comprise one or more of: resolution of an image, aspect ratio of an image, exposure time, usage of flashlight, color space, contrast setting, softening, and filtering.

12. A method, comprising:
receiving as an input an identification of two or more images or video clips;
determining stylistic settings of the identified two or more images or video clips by calculating average values of separate settings of each one of the two or more images or video clips, wherein the settings comprise color space, contrast setting, filtering, focus distance, file type, and compression ratio; and
applying the stylistic settings to one or more new images when controlling the forming the one or more new images, wherein the stylistic settings comprise an artistic filter.

13. The method of claim 12, further comprising: controlling a display to show a viewfinder image on the display and a thumbnail version of the two or more existing images or video clips on top of the viewfinder image.

14. The method of claim 12, further comprising: controlling a display to show a viewfinder image on the display and on top of the viewfinder image a thumbnail preview of the viewfinder image on which the determined settings have been applied.

15. The method of claim 12, further comprising: determining the settings from metadata stored in an image file.

16. The method of claim 12, further comprising: determining the settings by analyzing the two or more existing images or video clips.

17. The method of claim 12, further comprising: selecting settings on the basis of settings determined from more than two images.

18. The method of claim 12, further comprising: determining settings from an image or video clip shown last on a display.

19. The method of claim 12, further comprising: connecting to a network server storing images and/or video clips and determining settings of one or more existing images or video clips stored on the server.

20. A computer program product embodied on a non-transitory distribution medium readable by a computer and comprising program instructions which, when loaded into an apparatus, execute a computer process comprising:

receiving as an input an identification of two or more images or video clips;

determining stylistic settings of the identified two or more images or video clips by calculating average values of separate settings of each one of the two or more images or video clips, wherein the settings comprise color space, contrast setting, filtering, focus distance, file type, and compression ratio; and applying the stylistic settings to one or more new images when forming the one or more new images, wherein the stylistic settings comprise an artistic filter.

* * * * *